US009064299B2

(12) United States Patent
Sims

(10) Patent No.: US 9,064,299 B2
(45) Date of Patent: Jun. 23, 2015

(54) FILTERS AND FUNCTIONS USING EXPONENTIAL DECAY

(71) Applicant: Karl P. Sims, Cambridge, MA (US)

(72) Inventor: Karl P. Sims, Cambridge, MA (US)

( * ) Notice: Subject to any disclaimer, the term of this patent is extended or adjusted under 35 U.S.C. 154(b) by 157 days.

(21) Appl. No.: 13/948,789

(22) Filed: Jul. 23, 2013

(65) Prior Publication Data
US 2014/0050415 A1 Feb. 20, 2014

Related U.S. Application Data

(60) Provisional application No. 61/684,444, filed on Aug. 17, 2012.

(51) Int. Cl.
*G06K 9/40* (2006.01)
*G06T 5/00* (2006.01)
*G06F 7/556* (2006.01)

(52) U.S. Cl.
CPC .............. *G06T 5/001* (2013.01); *G06F 7/556* (2013.01); *G06T 5/002* (2013.01)

(58) Field of Classification Search
CPC .................. G06T 2207/20024; G06K 9/40
USPC ................................ 382/260, 264
See application file for complete search history.

(56) References Cited

U.S. PATENT DOCUMENTS

| 4,951,144 A * | 8/1990 | Des Jardins | 348/578 |
| 5,121,443 A * | 6/1992 | Tomlinson | 382/156 |
| 5,337,264 A * | 8/1994 | Levien | 708/300 |
| 8,064,726 B1 * | 11/2011 | d'Eon et al. | 382/279 |
| 2011/0085084 A1 * | 4/2011 | Jain et al. | 348/598 |
| 2014/0324362 A1 * | 10/2014 | Andersson et al. | 702/28 |

OTHER PUBLICATIONS

Crowley et al. ("Fast Computation of the Difference of Low-Pass Transform," IEEE Transactions of Pattern Analysis and Machine Intelligence, vol. PAMI-6, No. 2, Mar. 1984, pp. 212-222).*
Rachid Deriche "Fast Algorithms for Low-Level Vision," IEEE Transactions on Pattern Analysis and Machine Intelligence, 12(1):78-87 (1990).
Rachid Deriche "Recursively Implementing the Gaussian and Its Derivatives," Institut National de Recherche en Informatique et en Automatique, 1893(4):1-24 (1993).
Gunnar Farneback et al., "Improving Deriche-style Recursive Gaussian Filters," J Math Imaging Vis 26:293-299 (2006).
Diego Nehab et al., "GPU-Efficient Recursive Filtering and Summed-Area Tables," pp. 1-11, Proceedings of the 2011 SIGGRAPH Asia Conference (Dec. 2011).
Sylvain Paris "Edge-preserving Smoothing and Mean-shift Segmentation of Video Streams," Adobe Systems, Inc. pp. 1-14 (2008).

(Continued)

*Primary Examiner* — Yubin Hung
(74) *Attorney, Agent, or Firm* — Fish & Richardson P.C.

(57) ABSTRACT

The technology described in this document relates to filters and functions that are based on exponential decay functions. In one aspect, the technology is embodied in a method that includes using a computing device to compute a first function as a combination of (i) an exponential decay function, a decay factor for which is chosen based on a Gaussian function, and (ii) at least a second function that is obtained by one or more convolution operations on the decay function. The first function provides an approximation of at least a portion of the Gaussian function.

20 Claims, 6 Drawing Sheets

(56) References Cited

OTHER PUBLICATIONS

Sovira Tan et al., "Performance of three recursive algorithms for fast space-variant Gaussian filtering," Science Direct Real-Time Imaging 9 (2003) 215-228.

Bill Triggs et al., "Boundary Conditions for Young-van Vliet Recursive Filtering," IEEE Transactions on Signal Processing, 54(5):1-3 (2006).

Lucas J. van Vliet et al., "Recursive Gaussian Derivative Filters," IEEE Computer Society Press, vol. I, pp. 509-514 (1998).

Ben Weiss, "Fast Median and Bilateral Filtering," Shell & Slate Software Corp., pp. 1-8 (2006).

Qingxiong Yang et al., "Real-Time O(1) Bilateral Filtering," http://vision.ai.uiuc.edu/~qyang6/, pp. 1-8 (2009).

Ian T. Young et al., "Recursive implementation of the Gaussian filter," Signal Processing 44:139-151 (1995).

* cited by examiner

FILTERS AND FUNCTIONS USING EXPONENTIAL DECAY

RELATED APPLICATIONS

This application claims the benefit of U.S. Provisional Application Ser. No. 61/684,444, filed Aug. 17, 2012, the entire content of which is incorporated here by reference.

TECHNICAL FIELD

This disclosure relates to filters and functions that are based on exponential decay functions.

BACKGROUND

Gaussian blur filters are used in image-processing and special effects applications including image smoothing, sharpening, edge detection, glows, glints, soft focus, and others. The Gaussian kernel is separable so it can be efficiently applied in one dimension at a time. It also has an infinite impulse response (IIR) so every source pixel can affect every destination pixel.

SUMMARY

In one aspect, a method includes using a computing device to compute a first function as a combination of (i) an exponential decay function, a decay factor for which is chosen based on a Gaussian function, and (ii) at least a second function that is obtained by one or more convolution operations on the decay function. The first function provides an approximation of at least a portion of the Gaussian function.

In another aspect a method includes performing a set of operations for each pixel in a set of pixels representing a signal. The operations include updating a first memory location based on the pixel value and an exponential decay function that is based on a Gaussian filter kernel. The operations also include updating a second memory location based on an updated value in the first memory location, and computing a filtered pixel value as a combination of the updated values in the first and second memory locations, the filtered pixel value approximating a filtering of the signal by the Gaussian filter kernel.

In another aspect, a system includes memory and a processor. The processor is configured to compute a first function as a combination of (i) an exponential decay function, a decay factor for which is chosen based on a Gaussian function, and (ii) at least a second function that is obtained by one or more convolution operations on the decay function. The first function provides an approximation of at least a portion of the Gaussian function.

In another aspect a system includes a first memory location and a second memory location. The first memory location is configured to be updated based on (i) a pixel value of an input signal, and (ii) an exponential decay function that is based on a Gaussian filter kernel. The second memory location is configured to be updated based on an updated value in the first memory location. The system also includes circuitry configured to compute a filtered pixel value by combining the updated values in the first and second memory locations. The system further includes an output storage location configured to receive, the filtered pixel value as an approximation of a filtering of the signal by the Gaussian filter kernel.

In another aspect, computer program product includes a computer readable storage device encoded with instructions. Upon execution, the instructions cause one or more processors to compute a first function as a combination of (i) an exponential decay function, a decay factor for which is chosen based on a Gaussian function, and (ii) at least a second function that is obtained by one or more convolution operations on the decay function. The first function provides an approximation of at least a portion of the Gaussian function.

In another aspect, a computer program product includes a computer readable storage device encoded with instructions. Upon execution, the instructions cause one or more processors to perform a set of operations for each pixel in a set of pixel values representing a signal. The operations include updating a first memory location based on the pixel value and an exponential decay function that is based on a Gaussian filter kernel, and updating a second memory location based on an updated value in the first memory location. The operations also include computing a filtered pixel value as a combination of the updated values in the first and second memory locations. The filtered pixel value approximates a filtering of the signal by the Gaussian filter kernel.

Implementations can include one or more of the following.

The exponential decay function can include a spatial domain function or a time domain function. The approximation of the Gaussian function can be provided as a combination of the first function and a spatially-reversed version of the first function. The second function can be computed as a self-convolution of the decay function. The second function can be computed as a convolution between two convolution sums based on the decay function. Computing the combination can include selecting corresponding weights for the decay function and at least the second function such that a sum of the weights is substantially equal to one.

The first memory location can be updated based on a current value stored in the first memory location. The second memory location can be updated based on a decay factor of the exponential decay function and a current value stored in the second memory location. The combination can further include the original pixel value scaled in accordance with a weight. The filtered pixel values can be displayed on a display device or stored in a storage device. The original pixel values obtained from the signal can be distributed along two or more dimensions. The original pixel values obtained from the signal can be distributed along three dimensions. A third memory location can be updated based on an updated value in the second memory location.

The circuitry for computing the filtered pixel value can combine the updated value in the third memory location with the updated values in the first and second memory locations. The first or second memory location can include a register. The first memory location can be configured to be updated based on an output of an adder that sums a scaled version of the pixel value of the input signal with a scaled value from the first memory location. The second memory location can be configured to be updated based on an output of an adder that sums scaled values from the first and second memory locations. The third memory location can be configured to be updated based on an output of an adder that sums scaled values from the second and third memory locations.

Advantages of the technology described in this document can include one or more of the following. A Gaussian function or a filter kernel based on a Gaussian function (also referred to as a Gaussian kernel) can be approximated by using a combination of two or more functions derived from exponential functions. Because mathematical manipulations of exponential functions are typically straightforward, these computations can be performed in a computationally efficient fashion. In image processing applications, filter kernels based on the techniques described here are amenable to easy coding, and fast processing, and can be used for efficient computation using standard single or multi-core central processing unit (CPU) hardware, or graphics processing unit (GPU) hardware.

Other features and advantages are apparent from the following detailed description, and from the claims.

DETAILED DESCRIPTION

Gaussian functions are used in various applications. For example, in signal and image processing applications, Gaussian function based filter kernels can be used for smoothing or blurring signals. Processing based on Gaussian functions however can be computationally intensive and therefore often challenging in resource constrained environments, such as in real-time applications or mobile computing platforms. Computations based on a Gaussian function can be made faster and less resource-consuming by representing the Gaussian function as a combination of functions that are more amenable to resource constrained implementations. By choosing appropriate weights for combining the functions, the approximate representation can be made to closely resemble the Gaussian function.

Figure 1:
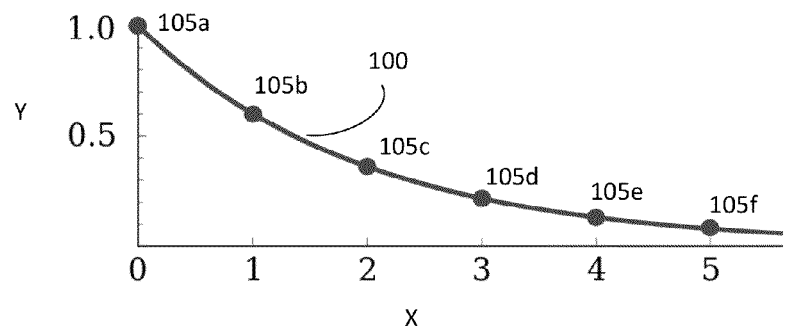
FIG. 1 is an example of an exponential decay function.

In some implementations, a Gaussian function can be represented using a combination of an exponential decay function and one or more additional functions that are derived from the decay function. FIG. 1 shows an example of an exponential decay curve 100 that can be used as the decay function. FIG. 1 also shows discrete samples 105a-105f (105 in general) of the exponential decay curve 100. A sample (for example, 105c) can be computed recursively by scaling the preceding sample (105b, in this example) in the series by a constant. If the decay rate per discrete sample is given by d where 0<d<1 with a larger d indicating a faster decay, then the values can be found by repeated scaling by s=1−d. In example of FIG. 1, d=0.4, the exponential decay curve 100 is given by y=0.6$^x$ and each discrete sample 105 of the exponential decay curve 100 can be computed as $y_x=0.6 \cdot y_{x-1}$, where x=1, 2, . . . , and represents discrete values of x.

Figure 2:
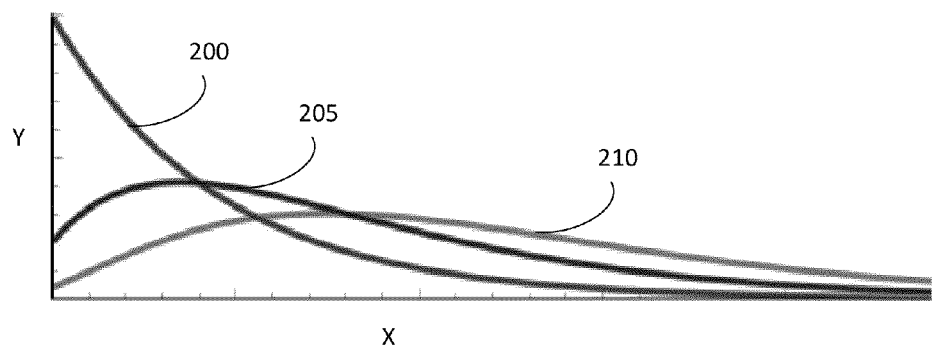
FIG. 2 shows an exponential decay curve and curves representing convolution operations on the exponential decay curve.

FIG. 2 shows examples of curves 205 and 210 that represent convolution operations on an exponential decay curve 200. A convolution operation can include, for example, convolving a curve (or function) with itself. This operation is also referred to as a self-convolution. The result of a convolution can be referred to as a convolution sum. Therefore, a result or convolution sum B representing a self-convolution of a function A is given by:

$$B = A*A$$

wherein the operator * denotes a convolution operation. A convolution operation can also include convolving two functions or curves. For example, a result or convolution product C representing a convolution between two functions A and B is given by:

$$C = A*B$$

In the examples of FIG. 2, the curve 205 represents the result of self-convolution of the exponential decay curve 200. The curve 210 represents the result of a convolution between the curves 200 and 205.

Figure 3:
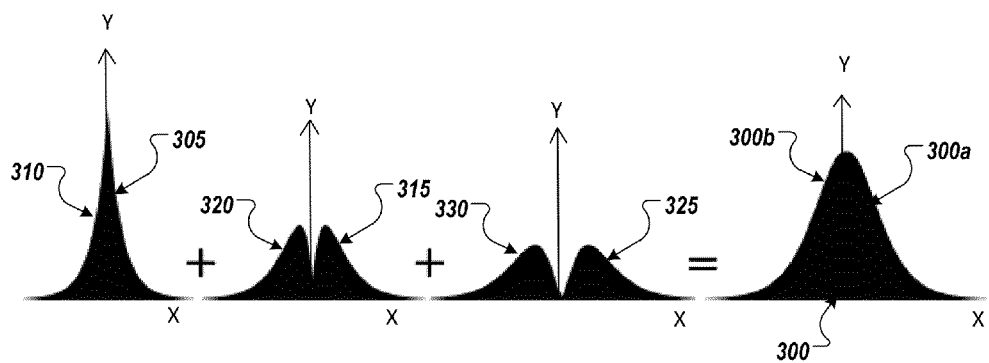
FIG. 3 is a schematic representation of approximating a Gaussian function.

In some implementations, a Gaussian function can be approximated as a weighted combination of an exponential decay curve and curves representing convolution sums based on the exponential decay curve. Each of these curves or functions can be referred to as a component of the approximation. This is schematically represented in FIG. 3. In this example, the portion 300a (i.e. the portion corresponding to positive x values) of a Gaussian function 300 is represented as a combination of an exponential curve 305, and two other curves 315 and 325. The portion 300b (i.e. the portion corresponding to the negative x values) of the Gaussian function 300 is represented as a combination of the curves 310, 320, and 330. Because the Gaussian function 300 depicted in this example is symmetric around the Y axis, the curves 310, 320, and 330 are mirror-images of the curves 305, 315, and 325, respectively, reflected on the Y axis. In some implementations, the curve 315 represents a convolution sum corresponding to a self-convolution of the curve 305. In some implementations, the curve 325 can represent a convolution sum corresponding to a convolution of the curves 305 and 315. Further, even though FIG. 3 illustrates a Gaussian function being represented as a combination of three curves (and their respective mirror images), a higher or lower number of curves can also be used for approximating the Gaussian function.

In general, for two discrete functions f[x] and g[x], the convolution sum y[x] is given by:

$$y[x] = \sum_{k=-\infty}^{\infty} f[k]g[x-k]$$

However, for discrete exponential decay functions, computation of convolution sums can be simplified. For example, to convolve a one-dimensional (1D) array of N samples of an exponential decay function, values in a destination array (which stores the convolution sum) can be efficiently computed based on the N samples of a source array. This can be done using a single register value r that is retained between the samples. This operation can be represented in a pseudo-code as follows:

```
r = 0
for x=0 to N−1
    r += d*(source[x] − r)
    dest[x] = r
```

In this example, the variables source [.] and dest[.] represent the source and destination arrays, respectively. The operation represented in the pseudo-code above can be viewed as being equivalent to a weighted linear interpolation between each new source value and the previous destination value.

In some implementations, multiple convolutions can be performed together during a single pass through the data by using more than one register value. For example, a discrete exponential function and two convolution sums based on the exponential function can be computed in a single pass as follows:

```
r1=r2=r3=0
for x from 0 to N−1
    r1 += d*(source[x] − r1)
    r2 += d*(r1 − r2)
    r3 += d*(r2 − r3)
    dest[x] = r3
```

In this example, r1, r2, and r3 represent three separate register values.

In some implementations, where reading and writing of data to and from memory takes more time than the actual computation, multiple convolutions (for example, three or four convolutions) can be calculated approximately at the same speed as a single convolution when done at once in the same pass through the data. This property can be used in efficient implementation of a Gaussian blur filter, as described next.

Gaussian blur filters are useful in various image-processing and special effects applications including, for example, image smoothing, sharpening, edge detection, glows, glints, and soft focus. Multi-dimensional Gaussian kernels are separable into two or more one-dimensional kernels. Therefore, two-dimensional (2D) kernels used in image processing applications can be efficiently separated into two 1D kernels and applied along one dimension at a time. A Gaussian filter kernel also has an infinite impulse response (IIR), and therefore a destination pixel can be affected by a large number of source pixels. In some cases, each destination pixel can be affected by all source pixels.

In some implementations, a Gaussian filter kernel can be approximated by combining multiple convolutions of an exponential decay filter kernel. The 2D Gaussian kernel can be separated into two 1D Gaussian kernels that are applied along the horizontal and vertical dimensions, respectively. For example, each of the 1D kernels can be substantially similar to the Gaussian function 300 depicted in FIG. 3. The 1D Gaussian kernels can then each be approximated, for example, as described above with reference to FIG. 3. To account for the forward functions (e.g., as represented by the curves 305, 315, and 325) and the corresponding mirror images (e.g. as represented by the curves 310, 320, and 330, respectively), a forward pass and a backward pass are processed for each dimension. For example, an image is first blurred horizontally by summing the results of a forward (right) pass and a backward (left) pass along the horizontal dimension. The image is also blurred vertically by summing the results of a forward (up) pass and backward (down) pass along the vertical dimension. In some implementations, each of these passes can use a weighted combination of one, two, three, or more simultaneous exponential decay convolutions, the weighted combination approximating a Gaussian shaped kernel.

In approximating a Gaussian function (or kernel) by two or more component functions (or kernel), the weights of the components are selected such that the combination closely resembles the Gaussian function (or kernel). For example, when approximating a Gaussian kernel with three component kernels, the weights, $w_1$, $w_2$, $w_3$, for the three component kernels are selected such that the resultant approximation or near-Gaussian final kernel has a slope substantially equal to zero at the center.

This can be done, for example, by finding the relative slopes, $m_1$, $m_2$, $m_3$, of each component, and then setting $w_3$ to 1.0, and setting both $w_1$ and $w_2$ to substantially equal values that give a resulting kernel with a slope at the center being substantially equal to zero. This can be mathematically represented using the following set of equations:

$$m_1 = \log(1-d)$$

$$m_2 = d(\log(1-d)+1)$$

$$m_3 = d^2(\log(1-d)+3/2)$$

$$w_1 = -m_3/(m_1+m_2)$$

$$w_2 = w_1$$

$$w_3 = 1$$

where the decay rate d (as defined above) is small for a large blur width (i.e. if the Gaussian kernel has a high standard deviation) and large for a small blur width (i.e. if the Gaussian kernel has a low standard deviation). In accordance with the set of equations shown above, for relatively small d values, the weights $w_1$, $w_2$, and $w_3$ are nearly equal. However, $w_1$ and $w_2$ are lower than $w_3$ for larger d values. The set of equations for finding the relative slopes $m_1$, $m_2$, $m_3$, and weights $w_1$, $w_2$, $w_3$, as shown above, are for illustrative purposes. Other methods of determining the relative slopes, and/or weights associated with the component curves, functions or kernels are within the scope of this disclosure.

In some implementations, to avoid the center value of the Gaussian being counted twice when summing the two directional passes (i.e. the forward and backward passes), an additional negative weight $w_0$ can be used to scale and subtract the input pixel value on one of the passes. The weight w0 can be determined as follows:

$$w_0 = -w_1 d - w_2 d^2 - w_3 d^3$$

The weights can then be normalized such that a sum of the weights, as used in both directional passes, is substantially equal to 1. For example, because $w_0$ is used only in one direction and the other weights are used in both directions, each of the weights can be normalized by the following scaling factor:

$$1/w_0 + 2(w_1 + w_2 + w_3))$$

When processing an image using a Gaussian kernel that is approximated as described above, the per dimension pixel processing can be represented using the following pseudo code:

```
// forward pass
r1=r2=r3=0
for x from 0 to N−1
    r1 += d*(source[x] − r1)
    r2 += d*(r1 − r2)
    r3 += d*(r2 − r3)
    dest[x] = w1*(r1 + r2) + w3*r3
// backward pass
r1=r2=r3=0
for x from N−1 to 0
    s = source[x]
    r1 += d*(s − r1)
    r2 += d*(r1 − r2)
    r3 += d*(r2 − r3)
    dest[x] += w0*s + w1*(r1 + r2) + w3*r3
```

The r values (i.e. r1, r2, and r3, in this example) can be initialized to zero such that pixels outside the borders of the source image appear black. Alternatively the r values can also be initialized as substantially equal to the edge pixel value. This provides a clamped appearance as if the edge pixels are replicated outside the borders of the source image. Additional "edge modes" can be implemented by performing more than one forward and one backward pass through the pixels. For example, to simulate a repeated or reflected copy of the source image beyond the borders, an initial partial pass can be used to preset the r values appropriately from the source image before computing the destination image.

The decay factor d can be selected based on a desired standard deviation σ as follows:

$$d=1-(0.091+0.0675\sigma^{-0.75})^{1/\sigma}$$

In some implementations, decay rates that correspond to various σ values can be pre-computed and stored in a computer readable storage device. The pre-computed decay rates can be determined using optimization techniques, for example, by comparing resultant approximations with target Gaussian functions and substantially minimizing the difference between the two. For instance, a decay rate for a given standard deviation value can be computed such that the mean squared error between the approximation and the target Gaussian function is below a threshold. The decay rate can also be computed in real time using, for example, the equation above. In some implementations, a combination of the above methods can also be used. For example, a set of pre-computed values can be stored in a computer readable storage device and if an input σ value does not correspond to a stored value, the decay rate can be computed in real time using the equation above or by interpolating between stored values.

Figure 4:
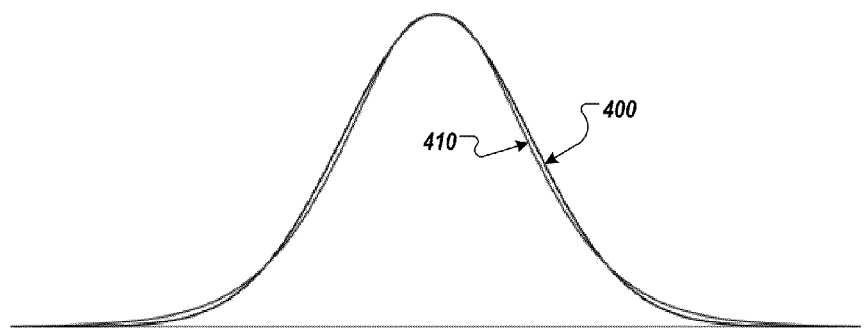
FIG. 4 shows a Gaussian function overlaid on a corresponding approximation.

FIG. 4 illustrates a Gaussian function 400 overlaid on a corresponding approximate curve 410. In this example, the standard deviation σ of the Gaussian function 400 is equal to 200 and the decay rate d of the corresponding exponential decay function is equal to 0.0118. The approximate curve 410 is obtained using a weighted combination of the exponential decay function and two convolution sums derived from the exponential decay function. The specific weights used for this example are approximately $w_1$=0.1662, $w_2$=0.1662, and $w_3$=0.1686, respectively, with $w_0$=−0.002 (which subtracts the original source image on one of the directional passes).

Figure 5:
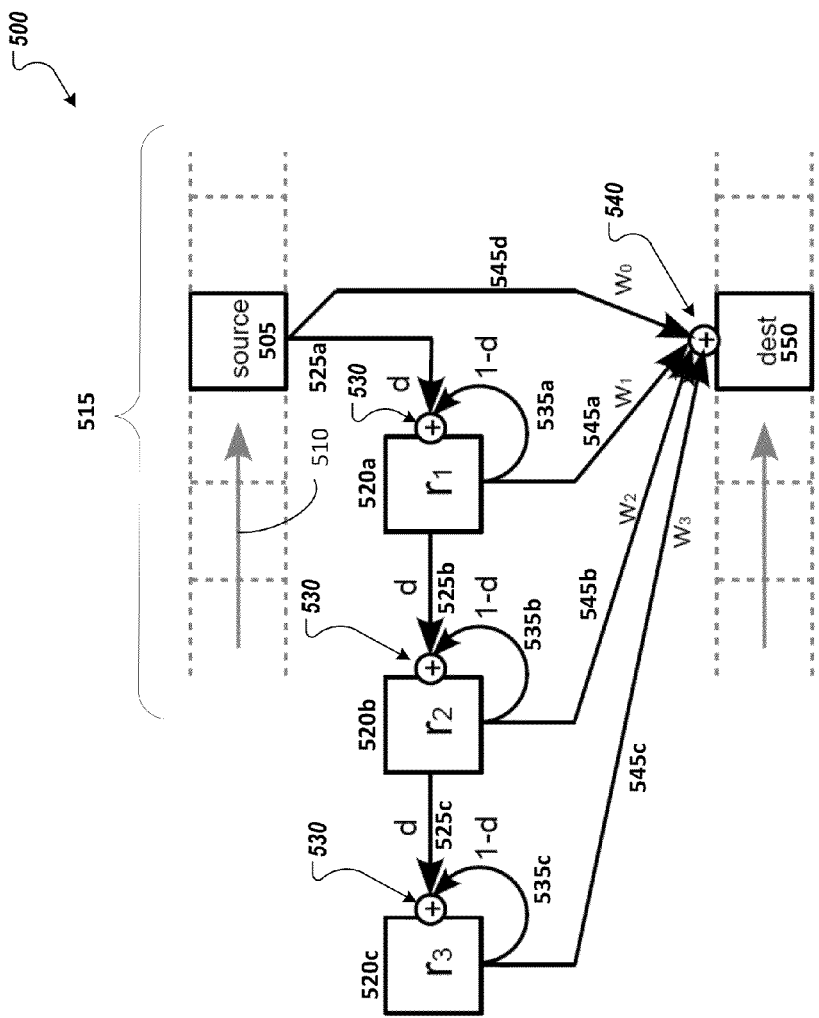
FIG. 5 is a schematic representation of an example digital filter system.

FIG. 5 illustrates a schematic representation of an example digital filter system 500 that implements an approximate Gaussian kernel as described above. The system 500 retrieves a value of a source pixel 505 (for example during a horizontal forward pass 510) in a given row 515 (or column, depending on the dimension along which processing takes place) of pixels. The value of the source pixel 505 can be stored in a storage device location such as a register. The system 500 also includes three registers 520a, 520b, and 520c (520, in general) that are connected in cascade with the register storing the value of the source pixel 505. The lines 525a, 525b, and 525c (525, in general) between the registers 520 each represents a multiplier (the value for which can be selected, for example, as substantially equal to the decay factor d). The system 500 also includes at least one adder 530 at the front end of each register 520. Each of the adders 530 can be configured to receive two inputs and provide an output (as a sum of the two inputs) for storing in a corresponding register 520. An output of each of the registers 520 is connected to a corresponding adder 530 through another multiplier. These multipliers are represented in FIG. 5 as lines 535a, 535b, and 535c (535, in general). In some implementations, a value for each of the multipliers 535 can be selected as substantially equal to (1-d). In some implementation, and as shown in the pseudo-code examples above, each register is incremented by d times the difference between the input and the current value of the corresponding register. Note that these two formulations: r+d*(source−r) as shown in the pseudo-code, and (1−d)*r+ d*source as shown in FIG. 5, are algebraically equivalent.

In some implementations, an output of the registers 520 are scaled by appropriate weights ($w_1$, $w_2$, and $w_3$, in this example) and added together using an adder 540. In some implementations, the value of the source pixel 505 is also scaled (for example by the weight TO and added with the scaled values from the registers 520 in one of the directional passes. Scaling of the outputs of the registers 520 and the value of the source pixel 505 can be implemented using multipliers that are represented in FIG. 5 as lines 545a-545d (545, in general). The output of the adder 540 represents a destination pixel value (i.e. a result approximating a filtering by a Gaussian kernel) 550. In the second or backward pass, the destination is incremented so that the destination receives the sum of both directional passes. The destination pixel value 550 can be stored in an appropriate storage device or provided to an output device such as a printer or a display device.

The time for computing a Gaussian blur using the approximation described here can be substantially invariant with respect to the blur width, and linear with respect to the total number of pixels over which the blur is computed. In some implementations, for large blur widths, the approximation methods described here can be faster than, for example using direct convolutions of Gaussian values, repeated box convolutions, or Fast Fourier Transforms (FFTs). In some implementations, the methods described here can be robust at large blur widths and can produce stable results using single precision (32-bit) floating point calculations. Therefore, smoothly animatable results can be achieved with 32-bit floating point calculations (as opposed to 64-bit calculations that may slow down calculations) even when the standard deviation of the approximated Gaussian is higher than, for example, 2000. In addition the kernel shapes achieved by the approximations described here are symmetrical, do not have negative values, and exhibit a smooth response at zero or center frequency (which can also be referred to as a DC response). For example, if the source image is of a solid color, the filtered result is of substantially the same color (e.g., when using the edge clamping mode). The overall computation time for methods described here is low because for each directional pass, only one memory read, and one write (or increment) operation is performed per pixel.

FIG. 5 describes one example hardware implementation. In some implementations, the approximations and filtering described here can be performed using a general purpose computer or processor. In such cases, the processor or general purpose computer can be programmed using computer readable instructions stored on a computer readable storage device. Other implementations are also possible, such as ones that include a Graphics Processing Unit (GPU).

A GPU (also referred to as a visual processing unit or VPU) is an electronic circuit that manipulates and alters memory to accelerate rendering of images stored at a memory location such as a frame buffer. GPUs can be used in, for example, embedded systems, mobile phones, personal computers, workstations, and game consoles. GPUs can have parallel structures designed to efficiently manipulate computer graphics and can be advantageous in situations where processing of large blocks of data is done in parallel. A GPU can be embodied in a video card, or can be disposed on a motherboard or in a CPU.

In some implementations specifically for multi-core processing such as on a GPU, the blurring technique described above may use one column of pixels per work-item or thread for vertical blurring, and one row per work-item or thread for horizontal blurring. In some GPU implementations, when processing of columns is significantly faster than processing rows due to more efficient memory access coherence, for faster processing of rows, the entire image can instead be transposed, processed by columns, and then transposed back. Alternatively, in other implementations, for fast processing of horizontal rows (or vertical columns), multiple adjacent pixels can be read and written together by each thread to improve memory access coherence. In some implementations, for more efficient processing of color images when the number of processing cores available is relatively high compared to the number of pixel columns (or rows) in the image, one core can be assigned to each of the RGB or RGBA color channel-columns (or rows), rather than assigning each whole-pixel column (or row) to one core. This allows 3 or 4 times as many cores, respectively, to be utilized at once. Using techniques described here, 1920×1080 RGBA images with 32 bit float precision per channel were blurred at a speed of about 200 frames per second using an NVidia GeForce GTX 580 (512 cores, 1.5 GHz).

The techniques described above have been described with respect to the spatial domain. In some implementations, the techniques can also be extended for processing in another domain such as the time domain. For example, an exponential decay curve can also be used in the time domain to create effects such as trails and motion detection. Some of these effects can include a temporal smoothing that can be achieved by combining each source frame with the previous result frame using a weighted average. This effectively includes convolving the input image sequence by an exponential decay kernel in the time dimension. In some implementations, the smoothing in time can also be performed using a curve with a less steep initial decline and a delayed peak, by using more than one exponential decay convolution (for example, similar to the curves 205 and 210 shown in FIG. 2 for the spatial domain). This way, an averaging over a large number of frames can be performed using, for example, only one or two frames worth of temporary memory.

In some implementations, simple motion detection can be performed by finding the difference between a frame and a time-smoothed result of multiple past frames. For instance, the following illustrative example uses the difference between a current frame and the result of two exponential decay convolutions. In this example, d is the decay rate, source and dest are the input and output sequences of N images sampled at each frame f, and r1 and r2 are images of temporary memory retained between frames. Omitting the pixel loops within the images, the pseudo-code can be represented as follows:

```
r1=r2=0
for f from 0 to N-1
    r1 += d*(source[f] - r1)
    r2 += d*(r1 - r2)
    dest[f] = abs(source[f] - r2)
```

Motion detection and time-smoothing can be combined with other procedures such as image warping, distortion, or fluid simulation, to create interesting time effects, possibly at interactive or real-time speeds.

Figure 6:
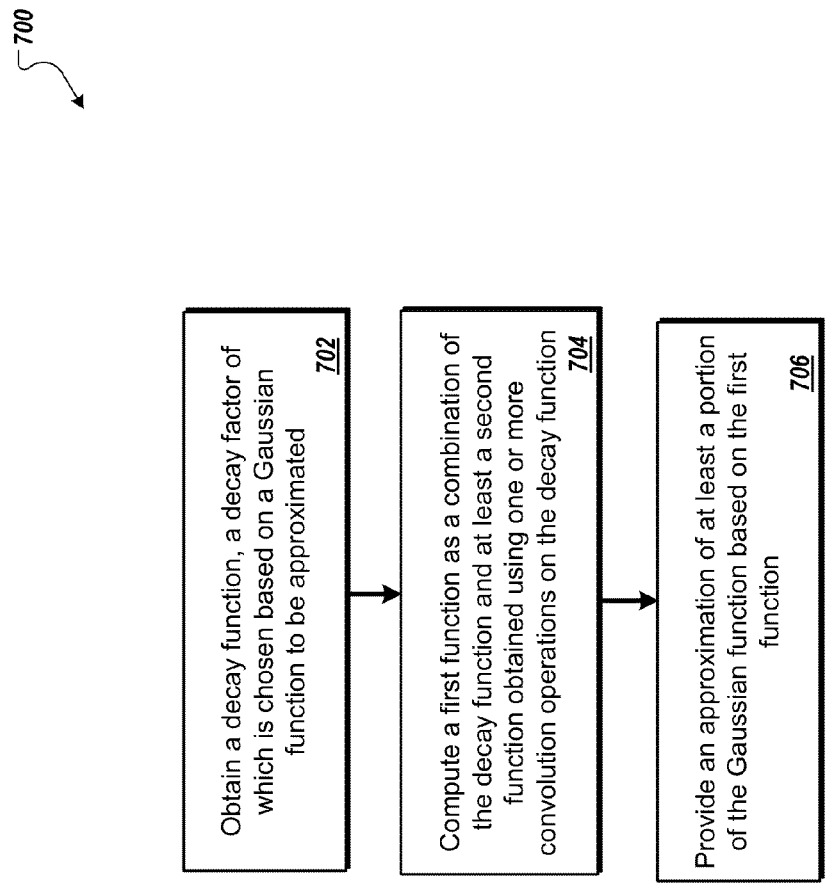
FIG. 6 is a flowchart depicting an example sequence of operations for approximating a Gaussian function.

FIG. 6 shows a flowchart 700 depicting an example sequence of operations for approximating a Gaussian function. The operations can include obtaining a decay function (702). A decay factor characterizing the decay function is chosen based on the Gaussian function that is to be approximated. The decay function can include, for example, a time domain function or a spatial domain function. In some implementations, the decay function is an exponential decay function. In some implementations, the decay function can be represented as substantially similar to the curve 305 or 310 described above with reference to FIG. 3.

Operations also include computing a first function as a combination of the decay function and at least a second function (704). The second function can be obtained using one or more convolution operations on the decay function. For example, the second function can be represented as a curve substantially similar to any one of the curves 315, 320, 325 or 330 described with reference to FIG. 3. In some implementations, the second function can be a combination of multiple functions. For example, the second function can include a combination of the curves 305, 315 and 325 shown in FIG. 3. Referring again to FIG. 3, if the decay function is the curve 305 and the second function is a combination of the curves 315 and 325, the first function represents the portion 300a of the Gaussian function 300.

Operations also include providing an approximation of at least a portion of the Gaussian function based on the first function (706). In some implementations, the approximation can include reversing the first function and combining the reversed portion symmetrically with the first function. For example, with reference to FIG. 3, if the first function represents the portion 300a of the Gaussian function 300, representing the entire Gaussian function 300 can include reversing the first function to obtain a function that represents the portion 300b of the Gaussian. If the first function is in the time domain, the approximation can include the first function and a time-reversed version of the first function. Similarly, if the first function is in the spatial domain, the approximation can include the first function and a spatially-reversed version of the first function.

Figure 7:
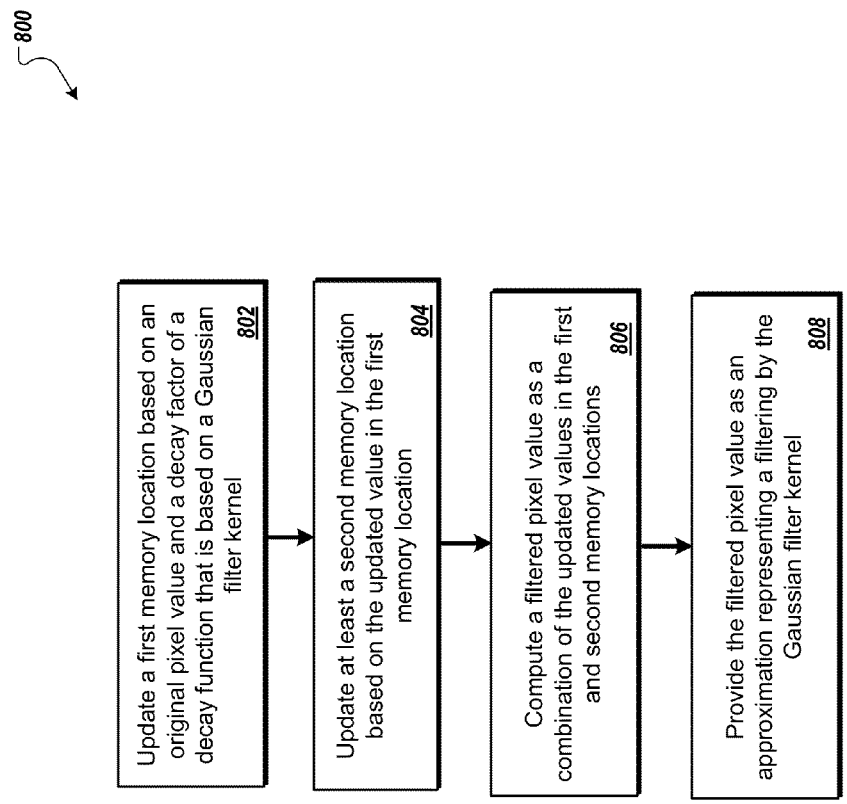
FIG. 7 is a flowchart depicting an example sequence of operations for filtering a digital image.

FIG. 7 is a flowchart 800 depicting an example sequence of operations for filtering a digital signal. The signal can include information on values distributed along one or more dimensions. For example, the signal can include information on pixels of a two-dimensional image. In some implementations, the signal can include information on voxels (also known as three dimensional pixels) distributed in three spatial dimensions. Operations can include updating a first memory location based on an original pixel value and a decay factor of a decay function (802). The decay factor d can be chosen based on a Gaussian filter kernel. For example, the decay factor can be chosen based on a standard deviation of the Gaussian filter kernel. In some implementations, the first memory location can be a storage device location such as the register 520a shown in FIG. 5 and updating the first memory location can include scaling the original pixel value by d, scaling a current value stored in the first memory location by (1-d) and summing the two scaled values.

Operations also include updating at least a second memory location based on the updated value in the first memory location (804). The second memory location can be a storage device location such as the register 520b shown in FIG. 5. Updating the second memory location can include, for example, scaling the updated value in the first memory location by d, scaling a current value stored in the second memory location by (1-d) and summing the two scaled values. Additional memory locations can also be updated. For example, as shown in FIG. 5, a third memory location can be stored in a storage device location such as the register 520c and updating the third memory location can include, for example, scaling the updated value in the second memory location by d, scaling a current value stored in the third memory location by (1-d) and summing the two scaled values.

Operations also include computing a filtered pixel value as a combination of the updated values in the first and second memory locations (806). In some implementations, the updated values in the first, second and possibly additional memory locations are combined after being scaled by appropriate weights. Referring again to the example shown in FIG. 5, the updated values in the memory locations (e.g. the registers 520) are weighted using the multipliers represented by the lines 545a-545c and combined to compute the filtered or destination pixel value 550. In some implementations, computing the filtered pixel value also includes scaling the original or source pixel value and combining the scaled original pixel value with the scaled and updated values in the memory locations.

Operations further include providing the filtered pixel value as an approximation representing a filtering by the Gaussian filter kernel (808). The filtered pixel value can be stored in a storage device or provided to an output device such as a printer or display device.

Figure 8:
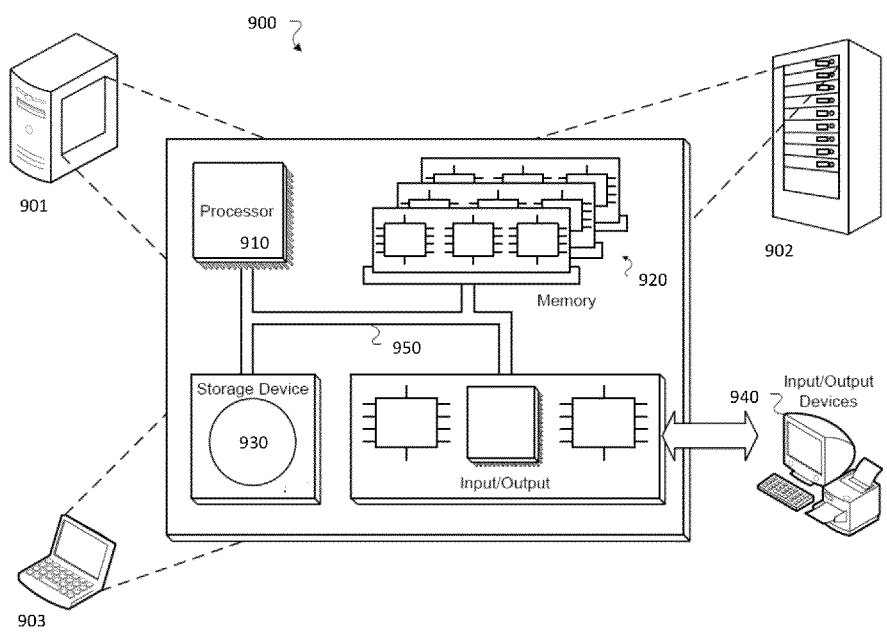
FIG. 8 is a diagram of a computing device.

FIG. 8 is a schematic diagram of a computer system 900. The system 900 can be used for the operations described in association with any of the computer-implemented methods described above, such as the sequences of operations represented by the flowcharts 700 or 800. The system 900 can be incorporated in various computing devices such as a desktop computer 901, server 902, and/or a mobile device 903 such as a laptop computer, mobile phone, tablet computer or electronic reader device. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940. In some implementations, the processor 910 is a mobile processor that is designed to save power. In some implementations, the processor 910 or the system 900 in general includes a GPU.

The memory 920 stores information within the system 900. In some implementations, the memory 920 is a computer-readable storage medium. The memory 920 can include volatile memory and/or non-volatile memory. The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In some implementations, the input/output device 940 includes a keyboard and/or pointing device. In some implementations, the input/output device 940 includes a display unit for displaying graphical user interfaces. In some implementations the input/output device can be configured to accept verbal (e.g. spoken) inputs.

The features described can be implemented in digital electronic circuitry, or in computer hardware, firmware, or in combinations of these. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display) monitor, eInk display or another type of display for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The processor 910 carries out instructions related to a computer program. The processor 910 may include hardware such as logic gates, adders, multipliers and counters. The processor 910 may further include a separate arithmetic logic unit (ALU) that performs arithmetic and logical operations.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems.

Accordingly, other implementations are within the scope of the following claims.

What is claimed is:

1. A method comprising:
for each of a set of pixel values representing a signal,
updating a first memory location based on the pixel value and an exponential decay function that is based on a Gaussian filter kernel;
updating a second memory location based on the current updated value in the first memory location as well as a decay factor of the exponential decay function and a current value stored in the second memory location
computing a filtered pixel value as a combination of the updated values in the first and second memory locations, the filtered pixel value approximating a filtering of the signal by the Gaussian filter kernel.

2. The method of claim 1, wherein updating the first memory location is based on a current value stored in the first memory location.

3. The method of claim 1, wherein the combination further includes the original pixel value scaled in accordance with a weight.

4. The method of claim 1, comprising displaying the filtered pixel values on a display device or storing the filtered pixel values in a storage device.

5. The method of claim 1, wherein the original pixel values obtained from the signal are distributed along two or more dimensions.

6. The method of claim 5, wherein the original pixel values obtained from the signal are distributed along three dimensions.

7. The method of claim 1, further comprising updating a third memory location based on an updated value in the second memory location.

8. A system comprising:
a first memory location that is configured to be updated based on (i) a pixel value of an input signal, and (ii) an exponential decay function that is based on a Gaussian filter kernel;
A second memory location that is configured to be updated based on the current updated value in the first memory location as well as a decay factor of the exponential decay function and a current value stored in the second memory location
circuitry configured to compute a filtered pixel value by combining the updated values in the first and second memory locations; and
an output storage location configured to receive the filtered pixel value as an approximation of a filtering of the signal by the Gaussian filter kernel.

9. The system of claim 8, comprising circuitry to update the first memory location based on a current value stored in the first memory location.

10. The system of claim 8, wherein the circuitry is configured to combine the updated values in the first and second memory locations with the original pixel value scaled in accordance with a weight.

11. The system of claim 8, comprising a display device configured to display the filtered pixel value.

12. The system of claim 8, wherein the original pixel values obtained from the signal are distributed along two or more dimensions.

13. The system of claim 12, wherein the original pixel values obtained from the signal are distributed along three dimensions.

14. The system of claim 8, further comprising a third memory location that is configured to be updated based on an updated value in the second memory location.

15. The system of claim 14 wherein the circuitry combines the updated value in the third memory location with the updated values in the first and second memory locations.

16. The system of claim 14 wherein the third memory location is configured to be updated based on an output of an adder that sums scaled values from the second and third memory locations.

17. The system of claim 8, wherein the first or second memory location comprises a register.

18. The system of claim 8 wherein the first memory location is configured to be updated based on an output of an adder that sums a scaled version of the pixel value of the input signal with a scaled value from the first memory location.

19. The system of claim 8 wherein the second memory location is configured to be updated based on an output of an adder that sums scaled values from the first and second memory locations.

20. A computer program product comprising a non-transitory, computer readable storage device encoded with instructions, which upon execution cause one or more processors to:
for each of a set of pixel values representing a signal,
update a first memory location based on the pixel value and an exponential decay function that is based on a Gaussian filter kernel;
update a second memory location based on the current updated value in the first memory location as well as a decay factor of the exponential decay function and a current value stored in the second memory location
compute a filtered pixel value as a combination of the updated values in the first and second memory locations, the filtered pixel value approximating a filtering of the signal by the Gaussian filter kernel.

* * * * *

UNITED STATES PATENT AND TRADEMARK OFFICE
CERTIFICATE OF CORRECTION

| | | |
|---|---|---|
| PATENT NO. | : 9,064,299 B2 | Page 1 of 1 |
| APPLICATION NO. | : 13/948789 | |
| DATED | : June 23, 2015 | |
| INVENTOR(S) | : Sims | |

It is certified that error appears in the above-identified patent and that said Letters Patent is hereby corrected as shown below:

In the claims
Col. 13, line 48, claim 8 delete "A" and insert -- a --

Signed and Sealed this
First Day of December, 2015

Michelle K. Lee
*Director of the United States Patent and Trademark Office*